United States Patent [19]

Bach

[11] 4,202,962

[45] May 13, 1980

[54] FIBERS OF ARYLENE OXADIAZOLE/ARYLENE N-ALKYLHYDRAZIDE COPOLYMER

[75] Inventor: Hartwig C. Bach, Pensacola, Fla.

[73] Assignee: Monsanto Company, St. Louis, Mo.

[21] Appl. No.: 3,174

[22] Filed: Jan. 15, 1979

Related U.S. Application Data

[60] Continuation-in-part of Ser. No. 739,165, Nov. 5, 1976, and a continuation-in-part of Ser. No. 886,317, Mar. 13, 1978, abandoned, which is a division of Ser. No. 520,503, Nov. 4, 1974, Pat. No. 4,115,503, which is a continuation-in-part of Ser. No. 390,667, Aug. 22, 1973, abandoned, and a continuation-in-part of Ser. No. 442,041, Dec. 5, 1973, abandoned, and a continuation-in-part of Ser. No. 202,590, Nov. 26, 1971, abandoned, and a continuation-in-part of Ser. No. 202,669, Nov. 26, 1971, abandoned.

[51] Int. Cl.² .............................................. C08G 73/08
[52] U.S. Cl. .............................. 528/363; 152/330 R; 264/176 F; 264/290.7
[58] Field of Search ........................ 528/363, 271, 332

[56] References Cited

U.S. PATENT DOCUMENTS

| | | | |
|---|---|---|---|
| 3,414,645 | 12/1968 | Morgan | 264/210 F |
| 3,632,548 | 1/1972 | Preston | 260/32.6 N |
| 3,642,708 | 2/1972 | Sekiguchi et al. | 528/332 |
| 3,644,283 | 2/1972 | Bach | 260/363 |
| 3,644,297 | 2/1972 | Sekiguchi et al. | 528/332 |
| 3,660,361 | 5/1972 | Bach | 260/332 |
| 3,671,542 | 6/1972 | Kwolek | 260/30.8 R |
| 3,673,143 | 6/1972 | Bair | 260/30.2 |
| 3,796,693 | 3/1974 | Morgan | 264/176 F |
| 3,817,941 | 6/1974 | Bair et al. | 260/332 |
| 3,819,587 | 6/1974 | Kwolek | 264/210 F |

FOREIGN PATENT DOCUMENTS 45-37791 11/1970 Japan.
1252508 11/1971 United Kingdom.

*Primary Examiner*—Harold D. Anderson
*Attorney, Agent, or Firm*—John W. Whisler

[57] ABSTRACT

High strength fibers of arylene oxadiazole/arylene N-alkylhydrazide copolymers are prepared by a unique solution spinning process, whereby an arylene oxadiazole/arylene N-alkyloxadiazolium hydrosulfate copolymer in sulfuric acid or oleum is extruded into an aqueous coagulation medium in which concurrently a fiber is formed and the latter-mentioned copolymer undergoes a chemical transformation to provide the first-mentioned copolymer.

7 Claims, No Drawings

FIBERS OF ARYLENE OXADIAZOLE/ARYLENE N-ALKYLHYDRAZIDE COPOLYMER

CROSS-REFERENCES TO RELATED APPLICATIONS

The present application is a continuation-in-part of Ser. No. 739,165, filed Nov. 5, 1976, and of Ser. No. 886,317 filed Mar. 13, 1978, now abandoned; Ser. No. 886,317 is a division of Ser. No. 520,503, filed Nov. 4, 1974, now U.S. Pat. No. 4,115,503; Ser. No. 520,503 is a continuation-in-part of Ser. No. 390,667, filed Aug. 22, 1973, now abandoned, and of Ser. No. 442,041, filed Dec. 5, 1973, now abandoned; Ser. No. 390,667 is a continuation of Ser. No. 202,590 filed Nov. 26, 1971, now abandoned; and Ser. No. 442,041 is a continuation of Ser. No. 202,669, filed Nov. 26, 1971, now abandoned.

BACKGROUND OF THE INVENTION

1. Field of the Invention

This invention relates to new and useful high strength fibers of arylene oxadiazole/arylene N-alkylhydrazide copolymers. The fibers are particularly useful in reinforcing applications such as in tire cord.

2. Description of the Prior Art

Imai, Journal of Applied Polymer Science, Vol. 14, pages 225-239 (January, 1970), describes the preparation of fibers from sulfuric acid solutions of p-phenylene oxadiazole/m-phenylene oxadiazole copolymers. Imai also describes unsuccessful attempts to prepare useful fibers from sulfuric acid solutions of poly-p-phenylene-1,3,4-oxadiazole.

U.S. Pat. No. 3,536,651 teaches the preparation and conversion of poly(terephthalic hydrazide) fiber to poly-p-phenylene-1,3,4-oxadiazole fiber by using the process described in U.S. Pat. No. 3,238,183, that is, by heating the polyhydrazide fiber to effect intra-linear dehydration-cyclization of the hydrazide moieties to oxadiazole moieties. According to the patent disclosures poly(terephthalic hydrazide) polymer is prepared in an N-substituted amide solvent, such as hexamethylphosphoramide, and is solution spun into fiber using dimethyl sulfoxide as the spinning solvent.

U.S. Pat. No. 3,642,708 teaches a process for the fabrication of shaped articles of poly-p-phenylene-1,3,4-oxadiazole by using an oxadiazole-N-methylhydrazide copolymeric resin as a precursor. The resin is prepared in fuming sulfuric acid and is stated to be significantly more soluble in common N-substituted amide solvents than is poly(terephthalic hydrazide). The process involves shaping an article of the copolymeric resin using a solution of the resin in an organic polar solvent, then removing the solvent by drying and finally heating the shaped article to between 220° C. and 350° C. to convert the N-methylhydrazide units to oxadiazole units:

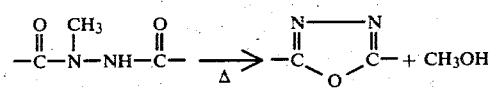

While the copolymeric resins illustrated in U.S. Pat. No. 3,642,708 may be useful for preparing films and coatings, the resins are not of sufficient molecular weight for preparing high strength fibers.

SUMMARY OF THE INVENTION

The present invention relates to high strength fibers of oxadiazole/N-alkylhydrazide copolymers consisting essentially of recurring units of the formula

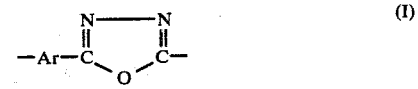

wherein Ar is arylene, such as

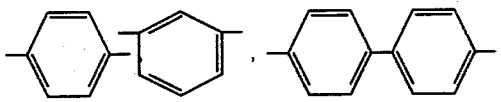

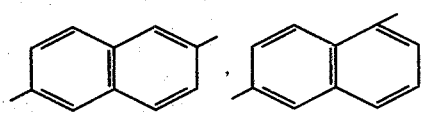

or

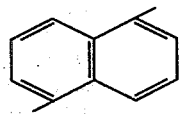

and may be the same or different in successive units, R is lower alkyl, that is, an alkyl group having from 1 to 4 carbon atoms and may be the same or different in successive units (II) of the copolymer and wherein the mole ratio of units (I) to units (II) is between 20:80 and 95:5.

The fibers have a tenacity of at least 8.5 grams per denier (gpd) and an initial modulus of at least 150 gpd and are prepared by extruding a spinning solution (i.e. dope) consisting essentially of (1) oleum or sulfuric acid of at least 90% and preferably at least 96% concentration and (2) an alkylated polyoxadiazole having an inherent viscosity of at least 2.0 (e.g. 2–12) and preferably at least 3.0 when measured as hereinafter defined and consisting essentially of recurring units of the formulas

and

wherein $X^{\ominus}$ is an anion contained in said dope, for example, anions derived from sulfuric acid or oleum, such as hydrosulfate ($HSO_4^{\ominus}$), sulfate and/or anions derived from hydrosulfate or sulfate anions by addition of $SO_3$ thereto, and, wherein Ar and R have the same meaning as previously defined, into an aqueous coagulation medium, such as water or aqueous sulfuric acid, to form fiber of a copolymer consisting essentially of recurring units of the formulas (I) and (II), and removing sulfuric acid from the resulting fiber. Normally occurring protonation

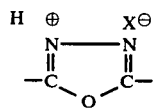

of units (A) is not shown in the above formula.

The term "fiber" as used herein includes a single filament or a bundle of filaments such as a yarn.

The term "Copolymer A" when used herein refers to copolymer consisting essentially of the above-defined recurring units (A) and (B).

The term "Copolymer B" when used herein refers to copolymer consisting essentially of the above-defined recurring units (I) and (II).

The term "reaction spinning" as used herein means the extruding of a dope into a coagulation medium where the polymer component of the dope concurrently is shaped into a fiber and undergoes a ring opening chemical transformation.

The process for preparing the fibers described herein the unusual in that it involves reaction spinning, that is, a dope is extruded into a coagulation medium where the polymer (i.e. Copolymer A) of the dope is concurrently shaped into fiber and undergoes a chemical transformation (i.e. hydrolysis) to yield an arylene oxadiazole/arylene N-alkylhydrazide copolymer (i.e. Copolymer B). In contrast, the prior art solution spinning processes used for the preparation of fiber of aromatic polymers, such as aromatic oxadiazoles, hydrazides, oxadiazole/N-methylhydrazide copolymers or polyamides, does not involve reaction spinning. The prior art processes merely involve extruding a dope into a coagulation medium where the polymer component of the dope is precipitated without any concurrent chemical transformation of the polymer occurring.

DESCRIPTION OF THE PREFERRED EMBODIMENTS

Fibers of the present invention are prepared by the reaction spinning process described herein and are characterized in having a tenacity ranging from 8.5 to about 30 gpd and a modulus ranging from 150 to about 625 gpd. Preferably, the fiber has a tenacity of at least 12 gpd and a modulus of at least 250 gpd with a tenacity of at least 18 gpd and a modulus of at least 350 gpd being particularly preferred. The fiber of this invention is composed of Copolymer B and has limited solubility, in that: when the fiber consists of between about 20 and about 50 mole percent of units (I), the only organic solvents which have been found to dissolve it are hexafluoroisopropanol (HFIP) and m-cresol; when the fiber consists of between about 50 and about 70 mole percent of units (I), HFIP will generally dissolve it but m-cresol will not; and when more than about 70 mole percent of the fiber consists of units (I), the fiber is usually insoluble in all organic solvents including HFIP. If one were to consider conventional solution spinning of this Copolymer B into fiber from organic solutions, neither HFIP nor m-cresol is a suitable spinning solvent. The high cost of HFIP precludes its use as a spinning solvent. On the other hand, Copolymer B will not satisfactorily coagulate from m-cresol in aqueous media.

The reaction spinning process useful in preparing the fibers of the present invention involves extruding a dope consisting essentially of oleum or sulfuric acid of at least 90% concentration and an alkylated polyarylene oxadiazole (Copolymer A) into an aqueous coagulation system or medium in which the alkylated polyarylene oxadiazole is concurrently shaped into fiber and hydrolyzed to form arylene oxadiazole/arylene N-alkylhydrazide copolymer (Copolymer B). The resulting fiber is then washed to remove sulfuric acid therefrom. Surprisingly, while Copolymer A is stable in oleum or concentrated sulfuric acid, Copolymer B rapidly degrades therein. The washed fiber may then be processed in a conventional manner, for example, dried, hot-stretched and collected. Optionally, a finish may be applied to the fiber prior to its being dried.

Suitable Dopes

Dopes useful in preparing the fibers of this invention comprise from 1 to 15 weight percent of more of Copolymer A having an inherent viscosity of at least 2.0 in solution with oleum or sulfuric acid of at least 90% concentration. The dopes are prepared by polymerizing appropriate monomers at a temperature between 80° and 170° C. for a period of time sufficient to provide a Copolymer A having an inherent viscosity of at least 2.0. The monomers comprise: (A) at least one aromatic dicarboxylic acid or a salt thereof or the amide or nitrile derivative thereof, (B) at least one dialkyl ester of an aromatic dicarboxylic acid and (C) hydrazine or the hydrate thereof or an acid salt thereof or mixtures thereof, in oleum, that is, fuming sulfuric acid containing sufficient sulfur trioxide (i.e., $SO_3$) to take up the water formed by the reaction, e.g. 10 to 40 weight percent $SO_3$ or higher, wherein the mole ratio of (A) to (B) is from 95:5 to 20:80 and preferably is from 40:60 to 80:20 with a ratio of between 40:60 and 60:40 being particularly preferred, and wherein the mole ratio of (C) to [(A)+(B)] is at least 1:1. If desired, higher or lower reaction temperatures may be used. At mole ratios of (A):(B) where (A) is greater than about 95 mole percent or less than about 20 mole percent, the resulting dope is not easily processed into useful fiber. Preferably (C) is present in a molar excess of a mole ratio of 1:1, (C):[(A)+(B)], in an amount of at least 0.5 mole percent and, preferably, about 0.8 to 4.0 mole percent excess.

The solution resulting from polymerization of (A), (B) and (C) in oleum, if necessary, is diluted with sulfuric acid or oleum to provide a dope of a suitable viscosity for solution spinning. This solution, diluted or undiluted, is then used as the spinning dope in practicing the reaction spinning process of the invention.

Preferred aromatic dicarboxylic acid reactants for use in preparing the dopes are terephthalic acid, isophthalic acid or mixtures thereof. When mixtures are used, any mole ratio of terephthalic acid to isophthalic acid may be employed, for example 99:1 to 1:99, with 75:25 to 90:10 being preferred. Instead of the acid, the amide or nitrile derivative thereof can be used or a salt thereof, for example, the diammonium salt.

Preferred dialkyl esters of aromatic dicarboxylic acids for use in preparing the dopes are the methyl or ethyl esters of terephthalic acid or isophthalic acid or mixtures thereof with the methyl esters being particularly preferred. When mixtures of esters of terephthalic and isophthalic acids are employed, the mole ratio thereof may range from 99:1 to 75:25, respectively, with a ratio of about 90:10 being preferred.

In preparing the dopes, the hydrazine reactant is preferably used in the form of an acid salt thereof, for example, hydrazine sulfate, hydrazine phosphate, hydrazine hydrochloride, with hydrazine sulfate being the preferred salt.

Preferably the dopes are prepared by first dissolving the reactants in oleum at a temperature below about 80° C., e.g., 25° to 70° C., at which temperature the reaction rate is very low and then heating the solution to a temperature above about 100° C., e.g., 120° C. to 150° C. or higher, at which temperature the reaction rate is quite high. By preparing the dopes by this technique, the amount of gel formation in the resulting solutions is minimized or eliminated.

Precipitation and isolation of Polymer A from the dope results in its chemical transformation to Polymer B via hydrolysis. As previously stated however, Polymer B when added to sulfuric acid or oleum rapidly degrades.

Preferred dopes for use in making fibers of the present invention are prepared by polymerizing terephthalic acid (TA), dimethyl terephthalate (DMT) and hydrazine sulfate (Hy) in oleum under conditions carefully selected to provide dopes exhibiting a polymer inherent viscosity (as hereinafter defined) between 3.0 to 12.0 before any optional dilution of the dope. In preparing these dopes the conditions which have been found to have a particular influence on the strength, that is, tenacity and modulus, of fibers prepared therefrom are: the reaction temperature, reaction time and the amounts of starting materials used in preparing the dope.

Reaction temperature and time: In preparing the dopes, the reaction temperature is related to the reaction time in the usual manner, that is, an increase of about 10° C. doubles the reaction rate. When high strength fibers are desired, the reaction is conducted at a temperature between about 120° C. and 150° C. or higher for a period of from 3 to 10 hours, for example, at a temperature of 140° C. for 6 hours. Initially, for example during the first hour of the reaction when using a reaction temperature of 140° C. and a TA to DMT mole ratio of 1:1, the product formed is almost entirely poly-p-phenylene-1,3,4-oxadiazole. Thereafter, however, methylation of this product occurs to provide the desired partially methylated oxadiazole (Copolymer A). Thus, the polymerization reactions involved in the formation of the partially methylated polyoxadiazole may be considered a two stage reaction. Accordingly, the mole ratio of the two repeating units of Copolymer A contained in the resulting dope depends on the reaction time and reaction temperature as well as the mole ratio of TA to DMT initially present.

Mole ratio of reactants: High strength fibers of Copolymer B are obtained from dopes that are prepared by polymerizing TA, DMT and Hy in fuming sulfuric acid using a reaction temperature of between 120° C. and 150° C., a reaction time between 4 and 6 hours and the following mole ratios: TA to DMT of 1:1; Hy to (TA+DMT) of 0.5% to 4.0% in excess of a 1:1 mole ratio; and $SO_3$ to (TA+DMT) of 3:1 to 8:1. Under these conditions the fiber prepared from the dope consist of a random copolymer made up of phenylene-1,3,4-oxadiazole units and phenylene-N-methylhydrazide units in a mole ratio of about 1:1.

Slight changes in the mole ratio of TA:DMT do not significantly affect the properties of the resulting fibers. However, in general as the TA content of the TA:DMT ratio increases from a 1:1 ratio the extensibility of the resulting fibers decreases and as the DMT content of the ratio increases from a 1:1 ratio the tensile properties of the resulting fibers decrease.

For a given set of reactants and reaction conditions Copolymer A of maximum inherent viscosity is provided by using a mole ratio of $SO_3$ (TA+DMT) of about 5:1. This mole ratio corresponds to providing a polymer concentration (as hereinafter defined) of about 6.8% in 20% oleum, 9.7% in 40% oleum, 12.2% in 40% oleum, and 17.3% in 65% oleum. When lesser or greater amounts of $SO_3$ are present, a reduction in the inherent viscosity of Copolymer A is observed. On the other hand, the Brookfield viscosity of the resulting polymer solution increases exponentially with increasing amounts of $SO_3$ present. Therefore, when a Copolymer A of maximum inherent viscosity is prepared, it is usually necessary to dilute the resulting solutions with oleum or $H_2SO_4$ to provide a dope of a suitable Brookfield viscosity for spinning.

For each particular set of reaction conditions there is an optimum amount of excess Hy which when present during polymerization provides Copolymer A of optimum inherent viscosity. This optimum amount of excess Hy increases with increases in the reaction temperature. When less than the optimum amount of excess Hy is present during polymerization, the inherent viscosity of the resulting Copolymer A decreases with decreasing amounts of Hy. When more than the optimum amount of Hy is present, Copolymer A becomes less linear with increasing amounts of Hy. Decreases in the linearity and/or inherent viscosity of the polymer results in losses in the tensile strength of the fiber.

The reaction conditions may be selected so that the resulting polymer solution may be used directly as the spinning solution without dilution thereof. Under such conditions the tensile properties of the fibers are usually somewhat lower than are attainable with dilution since the selection of reaction conditions in this instance must be compromised in order to provide a polymer solution of an appropriate viscosity for spinning. Undiluted solutions may be obtained, for example, by providing for the presence of less than the optimum amounts of solids during polymerization, e.g. by using a higher $SO_3$:(TA+DMT) ratio. Likewise, when the polymer solution is to be diluted with $H_2SO_4$ of 90% to 98% concentration a higher $SO_3$:(TA+DMT) ratio may be used in preparing the polymer solution than is used when the solution is to be diluted with oleum.

Spinning and Processing Conditions

In practicing the reaction spinning process of the present invention a fiber of Copolymer B is formed by extruding a dope of the type described above from one or more orifices of a spinneret into an aqueous coagulation system. The spinneret may be immersed in the coagulation system or it may be spaced a short distance, e.g. ⅛ to 2 inches (0.32 to 5.1 cm.) or more above the coagulation system. The fiber formed in the coagulation system is withdrawn therefrom, thoroughly washed with water alone or combinations of alkaline solution and water to remove $H_2SO_4$ therefrom, dried, hot stretched and collected. Optionally, a finish may be applied to the fiber prior to its being dried.

The reaction spinning process of the present invention is unique in that it involves the concurrent shaping of the extruded Copolymer A into fiber and the chemical transformation thereof into Copolymer B. Since Copolymer B formed in the coagulation system tends to degrade when it remains in contact with $H_2SO_4$, the resulting fiber is washed to remove $H_2SO_4$ therefrom. The presence of $H_2SO_4$ in the aqueous coagulation system is unavoidable since the spinning dope solvent is either oleum or $H_2SO_4$ of at least 90% concentration. Moreover, the coagulation system is preferably aqueous $H_2SO_4$.

Another unique feature of the process of the present invention is the ability to attain therewith, if desired, a high total stretch of the fiber. Total stretch is related to the total draw ratio which represents the ratio of the windup speed of the fiber to the extrusion speed of the dope. The total draw ratio in the process of the present invention is typically 40–80 and may be as high as 150 or higher. The maximum attainable draw ratio for a given process is normally limited by fiber breakage. High windup speeds are desirable from the standpoint of economics, i.e. production rates per spinning machine, capital investment, etc. Windup speeds as high as 2500 ft. (762 m.)/min. are easily attainable with the process described herein.

As in any spinning process, the tensile properties of fiber prepared by the reaction spinning process of the present invention are influenced by the conditions used in spinning and processing the fiber. These conditions are discussed in the following sections.

Spinnerets: Spinnerets and other apparatus which are in contact with $H_2SO_4$ should be made out of materials resistant thereto. The diameter of the orifices is usually less than 30 mils (0.762 mm.). In general, the diameter of the orifices, the length of the capillaries and the ratio of the length to diameter are not critical when extruding solutions having a Brookfield viscosity of about 2500 poise or less. However, when extruding solutions having a Brookfield viscosity of greater than 2500 poise, spinnerets having a tapered entrance, e.g. a conical entrance, to each orifice should be used to minimize any dope fracture that might otherwise occur. Dope fracture usually occurs when extruding highly viscous solutions of high molecular weight polymer from conventional straight-walled spinneret orifices and is characterized by the presence of turbulent flow of a dope at or near the entrance of an orifice. Turbulence of the dope causes cavitation and erratic flow of the dopes through and from the spinneret capillary which results in fiber of inferior quality. Although dope fracture may be eliminated by other means, such as, by reducing the viscosity of the dope or by slowing down the extrusion speed, these means generally result either in a loss of productivity or a reduction in the physical properties of the fiber or both.

Spinneret placement: The spinneret may be immersed in the coagulating system, i.e. wet spinning, or it may be placed a short distance above the coagulating system, i.e. dry jet-wet spinning.

Extrusion speed: The extrusion speed or velocity is the average velocity of the dope in the spinneret capillary as calculated from the volume of dope passing through an orifice per unit time and the cross-sectional area of the orifice and may range from 15 ft./min. (fpm) (4.6 meters/min.-mpm) or lower to 500 fmp (152.4 mpm) or higher. The minimum value for a given dope and orifice is determined by the ability of the dope to jet continuously and cleanly.

Dope temperature: The temperature of the dope being extruded is generally between about 20° C. and 140° C. and is controlled to provide a dope that jets continuously and cleanly.

Coagulating bath: The coagulating bath is an aqueous system. Useful aqueous systems range from pure water to systems containing about 65% sulfuric acid or sulfate salts such as ammonium sulfate. Additives, if desired, may be present in the systems. Preferably, the system consists of aqueous $H_2SO_4$ wherein the concentration of $H_2SO_4$ is greater than 40%, e.g. between 40% and 60%. At $H_2SO_4$ concentrations of greater than 75% adequate coagulation of the polymer may not occur. Satisfactory results are obtained with coagulating systems ranging from pure water to aqueous $H_2SO_4$ (60%). The temperature of the coagulation bath is not critical. Generally, the temperature of the bath may range from 0° C. to 95° C. or higher with room temperature being a convenient temperature to employ. Use of higher temperatures, that is temperatures above room tends to enhance the coagulation. However, if the temperature of the coagulating system is too high, hydrolysis of fiber tends to occur and the resulting fiber is difficult to collect without breaking it.

Jet stretch factor: Jet stretch factor as expressed herein is the ratio of the velocity of the fiber as it passes over the first godet (roll), i.e., as it is withdrawn from the coagulation bath to the extrusion velocity. Typically, the first godet withdraws the fiber from the coagulation bath and advances it toward the washing baths. The jet stretch factor may vary from 1:1 or lower to 25:1 or higher. The minimum jet stretch factor to be used with a particular dope and orifice is determined by the ability to form a fiber of relatively uniform denier and of desired physical properties and the maximum jet stretch factor to be used is limited by the speed at which the fiber can be pulled away without breakage. In general, when the jet stretch factor is increased from a low value, the tenacity of the processed fiber increases through a maximum value and thereafter decreases. The optimum jet stretch factor therefore is that factor which provides a fiber of maximum tenacity, for a given orifice size and dope, for example, an optimum jet stretch factor has been found to be about 8 for a spinneret having 12-mil orifices.

Washing: Copolymer B tends to degrade in the presence of $H_2SO_4$. The degree of Copolymer B degradation in the presence of sulfuric acid is a function of sulfuric acid concentration, time in contact therewith, shape of Copolymer B, that is surface to volume ratio, etc. Therefore sulfuric acid is removed from the coagulated fiber by washing it and, preferably, by washing it as quickly as possible so as to prevent any loss or significant loss in the tensile strength thereof. Of course, in certain end use applications of the fiber, a slight loss in the tensile properties of the fiber may be tolerable. Water alone and, preferably combinations of alkaline solutions (e.g. aqueous sodium carbonate) and water are used to neutralize and/or remove $H_2SO_4$ from the fiber. Satisfactory removal of $H_2SO_4$ from the fiber has been accomplished by washing the fiber immediately after its withdrawal from the coagulation system by using a series of wash baths where the first, third and fourth wash baths consist of water and the second wash bath consists of aqueous $Na_2CO_3$. Good results were obtained when the first, third and fourth wash baths were maintained at high temperatures, e.g. between 75° C. and 100° C. High wash bath temperatures (e.g. 95° C.) are preferred since the diffusion rate of liquid from the polymer is greater at higher temperatures.

Cascade factor: A relaxation or stretch may be imparted to the fiber subsequent to the jet stretch and prior to the hot stretch thereof, e.g. during the washing thereof. The amount of this relaxation or stretch imparted to the fiber is referred to as the cascade factor and is expressed as the ratio of the velocity of the filament just after and just prior to the cascade. The cascade stretch or relaxation further conditions the fiber and may vary from less than 1 to 5 or more, e.g. from 0.3 to 3.0. By application of a cascade relaxation, i.e. a cascade factor greater than zero and less than one, a higher total or overall draw of the fiber is obtained than when a cascade relaxation is omitted or a cascade stretch is employed. A maximum total draw of the fiber is obtained when the cascade factor ranges from 0.6 to 0.8. Total draw ratio, as expressed herein, is the ratio of the windup velocity of the fiber to the extrusion velocity.

Finish: Optionally, an appropriate finish may be applied to the fiber following the washing thereof.

Drying: The thoroughly washed fiber which, optionally, has a finish applied thereto may be conveniently dried by passing it over heated rolls, for example, at a temperature between 110° C. and 140° C.

Hot stretch factor: After the fiber is dried, it is hot-drawn at an elevated temperature (e.g. 200°–500° C.) by stretching the fiber several times its length while in contact with a heated environment, such as heated gas (e.g. nitrogen or air) or a heated metal surface (e.g. draw pin, roll, hot shoe), to further enhance its properties, in particular, to increase its tenacity and modulus. The hot stretch factor is expressed as the ratio of the velocity of the fiber as it is being collected to the velocity of the fiber as it is being dried. The hot stretch factor may range from 1 to 30. Generally when the hot stretch factor is increased from a low value, the tenacity of the resulting fiber increases through a maximum value and thereafter decreases. The optimum hot stretch factor is that factor which provides a fiber of maximum tenacity. According to a particularly preferred embodiment of the present invention the tensile properties of the fiber are enhanced by annealing the fiber after it is dried and before it is hot-drawn and, optionally, again after it is hot-drawn. The annealing of the fiber is accomplished by heating the fiber with little or no permanent extension of the fiber, for example, at a draw ratio of between 0.5 and 1.5. Preferably, the fiber is annealed at a temperature between about 20° and 100° C. below the temperature at which the fiber is subsequently hot-drawn. The fiber may be annealed by using conventional heating means, such as heating means useful in heating the fiber during hot-drawing. Thus, the fiber may be annealed by passing it through a heated environment or over a heated surface. According to one embodiment of the invention the fiber is passed from a steam-heated dryer roll around a hot pin (280° C.) at substantially constant length (draw ratio of 1.0), returned to the dryer roll, and after several wraps around the roll is hot-drawn over a series of hot shoes at about 350° C. The optimum temperatures to be used in annealing the fiber, of course, will depend on factors such as denier of the fiber, residence time of the fiber during annealing, etc.

Total draw: Total draw of the fiber has been previously defined and may range from for example, 6 to 360. A total draw of about 64 provides fiber of high tenacity and initial modulus when using a 12 mil (0.305 mm.) orifice with a dope having a polymer concentration of about 3%.

Measurements and Tests

The concentration of polymer in terms of weight percentage for a given dope used in the reaction spinning process of this invention is defined as the concentration that would result if the polymer in the dope were Copolymer B having a mole ratio of units (I) to units (II) corresponding to the mole ratio of dicarboxylic acid (e.g. TA) to dialkyl ester (e.g. DMT) used in preparing the dope. Of course the dopes do not actually contain Copolymer B and the mole ratio of units (I) to units (II) of fiber prepared therefrom may not correspond to the mole ratio of diacid to diester used in their preparation. The calculated concentration of the polymer of the dopes is used in obtaining inherent viscosity values and in controlling or monitoring the polymer concentration during preparation of a dope.

Inherent Viscosity: Inherent viscosity ($\eta_{inh}$) values, when given herein, are measured at 25° C. and are defined by the following equation:

$$\eta_{inh} = \ln RV/C$$

where C represents a concentration of 0.2 gram of polymer per 100 ml of solvent of the polymer solution and RV represents relative viscosity. The relative viscosity (RV) is determined by dividing the flow time in a capillary viscometer of a dilute polymer solution by the flow time for the pure solvent. The polymer solution used for the inherent viscosity determinations of the copolymer in the dope is obtained by dilution of a portion of the reaction product obtained in the preparation of the dope with concentrated sulfuric acid. The polymer concentration, as defined above, of the reaction product is determined and then a portion or sample of this product is diluted with an appropriate amount of concentrated sulfuric acid to obtain a solution having a polymer concentration of 0.2 g of polymer per 100 ml of solvent. The polymer solution used for the inherent viscosity determinations of Copolymer B is obtained by dissolving an appropriate amount of Copolymer B in hexafluoroisopropanol.

Tenacity (breaking tenacity) (T), elongation (breaking elongation) (E), maximum modulus (M) and toughness (Tg) of the continuous filament yarns prepared in the examples are obtained on an Instron Tester (Instron Engineering Corporation, Canton, Mass.) providing a constant extension rate of 10% per minute with a gauge length of 10 cm being used. The measured denier of the fiber sample (yarn bundle), test conditions and sample identifications are fed to a computer before the start of the test. The computer records the load-elongation curve of the sample until the sample is broken, calculates T (in terms of grams per denier, gpd), E (in units of percentage, %), M (in terms of gpd) and Tg (in units of gram centimeter per denier centimeter, gcm/den. cm) of the sample from the curve and fed information and provides a printout sheet with the calculated T, E, M and Tg values recorded thereon. Unless otherwise stated, the T, E and M values represent the average of five bundle breaks.

Chemical Analysis of Copolymer B: Chemical analysis of Copolymer B is accomplished according to the following procedure:

A polymer or fiber sample (0.6 g.) is refluxed for 3 hours in 15 ml. of 62% $H_2SO_4$. Then, 70 ml. of water is added, the mixture is cooled to 25° C. and filtered. The filtered-off precipitate is washed with water and the combined filtrate is diluted to a volume of 200 ml. with water. A 20 ml. aliquot of this solution is cooled to 0° C. and neutralized with sodium hydroxide to a pH of 6–9.

Acetylacetone (0.1 ml.) is added and the mixture is agitated for 1 hour. The quantity of the pyrazoles formed from the hydrazine and methylhydrazine produced during hydrolysis is determined by quantitative gas chromatography on a 10% FFAP on Chromosorb column. The molar ratio of hydrazine to methylhydrazine thus determined indicates the oxadiazole/N-methyl hydrazide copolymer ratio.

Proton Nuclear Magnetic Resonance (NMR) Analysis of Copolymer B: NMR analysis of Copolymer B is accomplished by the following procedure:

A fiber sample is dissolved in concentrated sulfuric acid at a 5–10% concentration effecting polymer hydrolysis. The aromatic (9.7–8.3 ppm) and methyl (4.3–3.7 ppm) proton absorption regions are scanned at 30° C. and referenced to tetramethyl silane at 0 ppm. The molar percentage of N-methyl hydrazide units is derived from the relative absorption intensities of the methyl to the aromatic protons by the following formula:

$$\% \text{ N-Methyl hydrazide} = \frac{\text{Methyl Intensity}/3}{\text{Aromatic Intensity}/4} \times 100$$

The following nonlimitive examples are given to further illustrate the invention.

EXAMPLE 1

This example illustrates the preparation of fiber of p-phenylene oxadiazole/N-methyl terephthalhydrazide copolymer, wherein a 75 to 25 molar ratio of terephthalic acid to dimethyl terephthalate and a 1.26% molar excess of hydrazine sulfate were used in preparing the dope from which fiber was reaction spun. 1184 g. (620 ml.) of fuming sulfuric acid (30% SO$_3$) was added with stirring at room temperature to a mixture of 48.48 g. of terephthalic acid, 18.88 g. of dimethylterephthalate, and 51.26 g. of hydrazine sulfate. The resulting mixture was then heated to 120° C. and maintained at this temperature for 6 hours. During this period the viscosity of the solution increased greatly and a total of 200 g. of fuming sulfuric acid (30% SO$_3$) and 100 g. of concentrated sulfuric acid were added to moderate the solution viscosity. The polymer in the resulting dope had an inherent viscosity of 3.8. This dope was reaction spun to fiber by extruding it through a 6.0 mil (0.1651 mm.), 10-hole spinneret into a coagulation bath consisting of 14% aqueous sulfuric acid maintained at 25° C. The spinneret was heated to 120° C. and kept ½ inch (12.7 mm.) above the coagulation liquid. After passage under a guide in the bath, the fiber was passed over a water wash roll, a neutralizing roll rotating in an aqueous 4% solution of sodium carbonate, through a water bath at 95° C., over another wash roll, a steam-heated drying roll and finally hot stretched over a hot-shoe at 383° C. and wound onto a bobbin at a speed of 434 ft. (132.3 m.)/min. The fiber had the following tensile properties.

| Tenacity: | 9.5 gpd |
|---|---|
| Elongation: | 4.0% |
| Modulus: | 301 gpd |

EXAMPLE 2

A p-phenylene oxadiazole/N-methyl terephthalhydrazide copolymer ($\eta_{inh}=2.9$) was prepared at 120° C. in fuming sulfuric acid (30% SO$_3$) similar to the procedure of Example 1 using a 70 to 30 molar ratio of terephthalic acid (45.25 g.) to dimethylterephthalate (22.66 g.) with a molar excess of hydrazine sulfate (51.21 g.) of 1.16% to provide a dope. A total of 1084 g. of fuming sulfuric acid (30% SO$_3$) was used for the reaction. The resulting dope was reaction spun to fiber at a speed of 420 ft. (128 m.)/min. as in Example 1 using a 6.5 mil (0.1651 mm.) 5-hole spinneret at 80°–100° C., a ½ inch (12.7 mm.) air space and water as the coagulation medium. The fiber had the following properties.

| Tenacity: | 8.5 gpd |
|---|---|
| Elongation: | 4.1% |
| Modulus: | 262 gpd |

EXAMPLE 3

A p-phenylene oxadiazole/N-methyl terephthalhydrazide copolymer ($\eta_{inh}=2.8$) was prepared in fuming sulfuric acid (30% SO$_3$) in 5½ hours at 140° C. similar to the procedure of Example 1 using a 45 to 55 molar ratio of terephthalic acid to dimethylterephthalate and a 1.58% molar excess of hydrazine sulfate. Following the spinning procedure described in Example 1 the resulting polymer solution (i.e. dope) was reaction spun to fiber at a speed of 787 ft. (239.9 m.)/min. using an 8 mil (0.2032 mm.), 10-hole spinneret at 120° C., a ½ inch (12.7 mm.) air space and water as the spin bath coagulant. The fiber was neutralized with a 4% sodium carbonate solution prior to drying and hot-drawing at 409° C. The fiber had the following properties.

| tenacity: | 9.0 gpd |
|---|---|
| Elongation: | 4.3% |
| Modulus: | 258 gpd |
| Denier/Filament: | 1.5 |

EXAMPLE 4

A p-phenylene oxadiazole/N-methyl terephthalhydrazide copolymer ($\eta_{inh}=3.6$) was prepared in fuming sulfuric acid (30% SO$_3$) similar to the procedure of Example 4 using a 75 to 25 molar ratio of terephthalic acid to dimethylterephthalate and a 1.2% molar excess of hydrazine sulfate to provide a dope. Following the procedure of Example 1 the resulting dope was reaction spun to fiber at a speed of 646 ft. (197 m.)/min., using an 8 mil (0.2032 mm.), 10-hole spinneret at 167° C., an air space of ½ inch (12.7 mm.) and an acidic aqueous 40% solution of ammonium sulfate as the coagulant. The fiber was neutralized with sodium carbonate prior to drying and hot-drawing. The fiber had the following properties.

| Tenacity: | 9.4 gpd |
|---|---|
| Elongation: | 5.2% |
| Modulus: | 282 gpd |

EXAMPLE 5

This example illustrates the effect of using too much or too little hydrazine in preparing dopes.

A p-phenylene oxadiazole/N-methyl terephthalhydrazide copolymer ($\eta_{inh}=4.0$) was prepared similar to the procedure of Example 1 in 5½ hours at 140° C. using a 75 to 25 molar ratio of terephthalic acid (45.0 g.) to dimethylterephthalate (17.76 g.) and a 3.3% molar excess of hydrazine sulfate (48.71 g.). The resulting very viscous dope could not be spun to good fiber because of the extreme dope viscosity. In a similar experiment using the same ratio of diacid to diester and no excess of hydrazine sulfate, a polymer was obtained having an inherent viscosity of only 0.8, a viscosity too low to yield a strong fiber upon spinning.

EXAMPLE 6

This example illustrates the advantage of dissolving the reactants prior to the major part of the polymerization reaction. A mixture of terephthalic acid (1245 g., 75 mole %), dimethylterephthalate (485 g., 25 mole %), and hydrazine sulfate (1313 g., 1% molar excess) in 35 pounds (15.88 kg) of fuming sulfuric acid (20% $SO_3$) was stirred at room temperature for 19 hours. At this time all reactants had dissolved. The reaction mixture was heated with stirring at 100°–105° C. for one hour, then at 140° C. for 12 hours. The dope was diluted with 11 pounds (4.99 kg.) of fuming sulfuric acid (20% $SO_3$) prior to spinning. The polymer had an inherent viscosity of 3.3. The dope contained no gel particles and could be easily dry jet-wet spun to strong fiber.

In a similar experiment the same molar ratio of monomers was used but the reaction mixture was heated to the polymerization temperature of 140° C. without prior dissolution of the reactants. The resulting dope contained many gel particles and could not be spun successfully.

EXAMPLES 7–11

Examples 7–11 illustrate preferred embodiments of the invention. In each example the general procedure described in Example 1 was followed for the preparation of the dope and for the spinning of the dope to fibers with the exception that the reactants were dissolved in the oleum as in Example 12 prior to any substantial polymerization thereof. The specific conditions employed in each of these Examples are given in Table 1. Example 13 illustrates the preparation of fiber from a dope obtained by polymerization of the reactants at 144° C. to provide a polymerization product that was diluted with 20% oleum. The dope of Example 14 was prepared in the same manner except that a lower polymerization temperature (i.e. 137° C.) was employed. The dope of Example 15 was prepared in the same manner as the dope of Example 14 except that a higher solids concentration was employed during polymerization and the resulting polymerization product was diluted with sulfuric acid of 85% concentration rather than with 20% oleum. The dopes of Examples 10 and 11 were prepared directly without dilution of the polymerization product. In each instance the resulting dopes were reaction spun to high strength, high modulus fiber, the properties of which are given in Table 1. Surprisingly, dopes containing higher molecular weight polymer can be prepared by the dilution technique than can be prepared without dilution. In conventional solution polymerization polymer concentration has little effect on the molecular weight ($\eta_{inh}$) of the resulting polymer. However, in preparing the dopes described therein polymer concentration plays an important role, for example, in 20% oleum a polymer concentration of about 7.5% is required to reach a polymer inherent viscosity of about 4.0 at a polymerization temperature of 137° C. in 6 hours. At this concentration, however, the Brookfield viscosity of the polymerization product is too high to be easily spun to fiber by conventional techniques. Therefore, the dilution technique illustrated in Examples 7 and 8 is used to provide not only spinnable dopes but dopes which contain higher molecular weight polymer at a given polymer concentration than is obtainable without dilution. The molecular weight of the polymer in the dope of Example 9 wherein aqueous sulfuric acid is used as the diluent is somewhat lower than in Examples 7 and 8 wherein oleum was used.

Table 1

| Example No. | 7 | 8 | 9 | 10 | 11 |
|---|---|---|---|---|---|
| Polymer Reaction Conditions | | | | | |
| Molar Ratio of TA:DMT | 50/50 | 50/50 | 40/60 | 50/50 | 50/50 |
| Oleum, % $SO_3$ | 20 | 20 | 20 | 20 | 20 |
| $SO_3$ Theoretically Utilized During Polymerization, % | 60 | 60 | 50 | 38 | 60 |
| Excess Hydrazine Sulfate, % | 4.0 | 1.5 | 1.5 | 1.5 | 1.5 |
| Polymer Concentration of Undiluted Dope, % | 6.5 | 7.5 | 8.0 | 4.9 | 7.0 |
| Polymer Concentration of Diluted Dope, % | 3.0 | 2.4 | 6.5 | — | — |
| Diluting Agent | 20% oleum | 20% oleum | 85% $H_2SO_4$ | | |
| Reaction Time, hrs. | 6 | 6.5 | 6.5 | 4 | 7 |
| Reaction Temperature, °C. | 144 | 137 | 137 | 137–140 | 149 |
| Inherent Viscosity of Polymer in Dope | 3.8 | 4.0 | 2.8 | 3.1 | 3.1 |
| Brookfield Viscosity of Spinning Dope, poise | 2,320 | 960 | 6,000 | 3,920 | 18,360 |
| Spinning Conditions | | | | | |
| Extrusion Speed, ft/min | 25.7 | 20.0 | 15 | 15 | 284 |
| m/min | 7.8 | 6.1 | 4.6 | 4.6 | 86.6 |
| Wind-up Speed, ft/min | 2142 | 1603 | 1236 | 1066 | 1435 |
| m/min | 652.9 | 488.6 | 376.7 | 324.9 | 337.4 |
| Jet Stretch | 7.0 | 12.0 | 15.0 | 10.0 | .44 |
| Cascade Stretch | .55 | .97 | .88 | .75 | .74 |

Table 1-continued

| Example No. | 7 | 8 | 9 | 10 | 11 |
|---|---|---|---|---|---|
| Hot Stretch | 21.1 | 6.9 | 6.1 | 9.4 | 15.3 |
| Hot Stretch Temperature, °C. | 374 | 402 | 377 | 366 | 361 |
| Total Stretch | 83 | 80 | 82 | 71 | 5.1 |
| Spinneret Capillary | | | | | |
| Diameter, mil. | 8 | 12 | 12 | 8 | 3 |
| mm. | .2032 | .3048 | .3048 | .2032 | .0762 |
| Fiber Properties | | | | | |
| Tenacity, g/den | 16.3* | 15.4 | 14.6 | 14.6 | 13.2 |
| Elongation, % | 6.7 | 6.3 | 6.3 | 5.9 | 6.5 |
| Modulus, g/den | 297 | 387 | 347 | 309 | 280 |
| Toughness, c.cm/den.cm. | .53 | .50 | .49 | .45 | .45 |
| Inherent Viscosity of Fiber | | | | | |
| Polymer | 2.7 | 2.7 | 2.2 | 2.4 | — |

*one of the five bundle breaks had T/M/E values of 17.9 gpd/6.9%/327 gpd.

EXAMPLE 12

This example illustrates the preparation of high tenacity fiber by the reaction spinning process of the present invention wherein the spinneret is immersed in the coagulating liquid.

A polymer solution was prepared similar to the procedure used in Example 1 from a 50 to 50 molar ratio of terephthalic acid (1245.5 g.) to dimethylterephthalate (1456.2 g.) dissolved in 20% oleum (62 lbs. 28.12 kg.) using a 1.5% excess of hydrazine sulfate. The reaction was carried out at 137° C. for 6.5 hours. The resulting reaction mixture was diluted with 20% oleum to a polymer concentration of 2.5% to provide a dope with a polymer inherent viscosity of 4.2. This dope was reaction spun to fiber through a 25 hole, 10 mil (0.254 mm.) spinneret which was immersed in the water used as a coagulation bath. Fiber, processed as in Example 1, was collected at a windup speed of 1484 ft./min. (452.3 mpm) and had the following tensile properties.

| Tenacity: | 12.4 gpd |
| Elongation: | 6.1% |
| Modulus: | 285 gpd |
| Toughness | .40 g. cm./den. cm. |

EXAMPLE 13

This example illustrates the preparation of tire cord from fiber of p-phenylene oxadiazole/p-phenylene N-methylhydrazide copolymer.

Nominal 1500 denier yarn having an average T/E/M of 11.2 gpd 6.0%/240 gpd was prepared similar to the procedure used in Example 16. This yarn was twisted to 7 turns per inch (tip) (275.6 turn per meter-tpm) to provide a strand. Two such strands were then twisted together with a twist of 7 tpi in the opposite direction to provide a balanced tire cord (1500/2,7×7) having a T/E/M of 10.3 gpd/7.6%/147 gpd.

A 1500/2, 3×7 cord, similar to the above cord was prepared from fiber made using the procedure of Example 14 with the exception that in this instance the mole ratio of TA to DMT was 75:25 instead of 50:50. This cord was used in the belt of a G78-14 bias-belted tire which was tested on a cobblestone track along with two other G-78-14 bias-belted tires, one having an equal strength belt of steel and the other having an equal strength belt of glass. After 5940 laps (594 miles; 955.9 kilometers), there was no apparent damage to the cords made of the fiber of the present invention, whereas the steel and glass cords showed considerable damage.

A 1500/2, 11×11 tire cord (11 tpi=449 tpm), made from fiber prepared according to the procedure of Example 14 was used as the reinforcing cord for the carcass of JR 78-15 monoply radial steel-belted tires. In laboratory wheel testing one of these tires was inflated to 20 psig (2.3609 atm.) run for 21,000 miles (33,795.3 km.) at 50 mph (80.5 kilometers/hr.) under a load of 1860 lbs. (843.9 kg.) at 100° F. (38° C.) without cord failure. Another of these tires was run for 13,275 miles (21,363.5 kilometers) under the same testing conditions. The carcass cords were then removed from the tire and the tenacity thereof determined. It was found that the cords retained 90% of their original tenacity after 13,275 miles which demonstrates that the cords possess good fatigue resistance.

EXAMPLE 14

This example establishes that the chemical composition of Copolymer A and Copolymer B are different and that a major copolymeric unit in Copolymer A is the N-alkyloxadiazolium hydrosulfate unit, i.e.

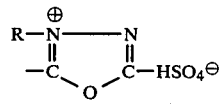

A dope was prepared similarly to the procedure used in Example 13 from a 50:50 molar ratio of terephthalic acid (1122.9 g.) to dimethylterephthalate (1312.4 g.) employing a 1.5% molar excess of hydrazine sulfate (1785.3 g.) in 25% oleum. A 4 hour reaction time at 137° C. was used. After dilution with 75% sulfuric acid and oleum a spinnable dope was obtained of a copolymer having an inherent viscosity of 2.3. A sample of this dope was analyzed by proton and $C^{13}$ nuclear magnetic resonance (NMR). The following relevant signals were observed:

| Proton | NMR (34° C.) | 5.10 ppm | | 4.13 ppm |
|---|---|---|---|---|
| $C^{13}$ | NMR | 190.7 ppm | 190.7 ppm | 118.1 ppm |

In the proton NMR the signal at 5.10 ppm was demonstrated to be different from that obtained from methyl hydrazine sulfate (4.13 ppm.). In the $C^{13}$ NMR spectrum the signals at 192.5, 190.7, and 188.1 ppm downfield from an external standard, hexafluoroisopropanol, were interpreted to result from the carbon atoms of N-substituted and unsubstituted oxadiazole units. The positioning of the signal at 192.5 ppm for the N-unsubstituted unit was confirmed by the $C^{13}$ NMR spectrum of authentic Poly(p-phenylene oxadiazole) in oleum. The other absorptions are attributed to the N-methyl oxadiazolium hydrosulfate because of their proximity to the oxadiazole absorption at 192.5 ppm. Since N-methyloxadiazolium hydrosulfate units are unsymmetrical two signals were expected and actually obtained, thereby confirming their structure. The dope was reaction spun into water and a fiber of good tensile properties was obtained. It was chemically analyzed and found to consist of 51.5 mole % p-phenylene oxadiazole and 48.5 mole % p-phenylene N-methylhydrazide units. The fiber polymer had an intrinsic viscosity of 1.95. In contrast, when dissolved in concentrated sulfuric acid, an intrinsic viscosity of only 0.1 was obtained. This illustrates the instability of the fiber polymer (Copolymer B) in sulfuric acid. Upon proton NMR analysis of the fiber polymer in 93% sulfuric acid, a signal at 4.42 ppm was initially observed indicating the protons of the methyl group attached to the N-methyl hydrazide polymer linkage. Within a few minutes this signal vanished and a signal at 4.13 ppm was observed, which signal resulted from methyl hydrazine sulfate obtained as a fiber polymer degradation product. The differing signals of the initial spectra of the fiber dissolved in 98% sulfuric acid and the dope polymer with 98% sulfuric acid as its solvent demonstrate the different chemical structure of dope and fiber polymer.

EXAMPLE 15

A m-phenylene oxadiazole/N-methyl isophthalhydrazide copolymer ($\eta_{inh}=2.3$) was prepared at 142° C. with a reaction time of 6 hours in fuming sulfuric acid (40% $SO_3$) similar to the procedure of Example 1 using a 50 to 50 molar ratio of isophthalic acid (1210.8 g.) to dimethyl isophthalate (1415.1 g.) with a 1.5% molar excess of hydrazine sulfate (1925.1 g.) to provide a dope with a polymer concentration of 12.2%. A total of 14,575 g. of fuming sulfuric acid (40% $SO_3$) was used for the reaction. The resulting dope was reaction spun to fiber by extruding it through a 4 mil (0.1016 mm.), 25 hole spinneret into an air space of ½ inch (1.27 cm.) and then into water at 25° C. After using a spinning procedure similar to that of Example 1, white, lustrous fiber was found up on a bobbin at a speed of 859.3 ft./min. (265 m./min.). The fiber had good tensile properties.

EXAMPLE 16

This example illustrates an increase in tensile properties obtained by annealing the fiber after it is dried and before it is hot-drawn.

A fiber of para-phenylene oxadiazole/N-methylhydrazide copolymer was prepared by the following procedure. Into a 10-gallon (37.8 liter) heated glass-lined reactor fitted with a motor-driven helical stirrer were pumped 24963 g. of fuming sulfuric acid (22% $SO_3$), to which 1246.2 g. (7.5 moles) of terephthalic acid, 1456.5 g. (7.5 moles) of dimethyl terephthalate, and 1982.3 g. (15.2 moles) of hydrazine sulfate were added. The reaction mixture was stirred at 60° C. to effect solution, then the temperature was raised and maintained at 120° C. for 48 hours. This extremely viscous solution (8.1% polymer solids) was allowed to cool at 80° C. and was diluted to about 5% solids by stirring with 17148 g. of 100% sulfuric acid. The resulting polymer solution (dope) was spun to fiber by extruding it through a 4 mil, 24-hole spinneret into a water bath maintained at 23° C. The spinneret was heated to 140° C. and kept ½ inch (12.7 mm.) above the water. After passage under a guide in the bath, the fiber was passed over a water wash roll, a neutralizing roll rotating in an aqueous 4% solution of sodium carbonate, through a water bath at 90° C. and over another wash roll. The fiber was then treated with a polyorganosiloxane finish by passing the yarn over a transfer roll partially immersed in an aqueous 0.5% emulsion of a blend of (i) 3 parts by weight of an organopolysiloxane having dimethyl and phenyl groups in a 50/50 ratio (obtained commercially from Dow Corning under the Tradename Dow Corning 550 Fluid) and (ii) 1 part by weight of an organopolysiloxane having dimethyl and phenylmethyl groups and one polyethyleneoxide side chain (obtained commercially from Dow Corning under the Tradename Dow Corning FF-400). Then, after the fiber was passed over and around a steam-heated drying roll (several wraps), the fiber was pulled around a 280° C. hot pin (one wrap) with a draw ratio of 1.0 and returned to said dryer roll. After several wraps around the roll, the fiber was drawn 22.8 times over a series of two hot shoes at 347° C. and 357° C. and finally collected at 1173 feet (357.5 m) per minute. The resulting fiber (Fiber 16A) had the following tensile properties:

| Tenacity: | 18.2 gpd |
|---|---|
| Elongation-to-break ($E_b$): | 5.9% |
| Modulus (max): | 408 gpd |
| Work-to-break: | 0.56 gcm/den.cm. |

The above-experiment was repeated with the exception that the hot pin was removed. In this instance the fiber was not annealed prior to hot-drawing and could be hot-drawn only 20.7 times. The tensile properties of this fiber (Fiber 16B) were:

| Tenacity: | 13.2 gpd |
|---|---|
| $E_b$: | 5.8% |
| Modulus: | 274 gpd |
| Work-to-break: | 0.40 gcm/den.cm. |

The composition of the yarn polymer in both of the above experiments was determined to be 32 mole % recurring units of the formula

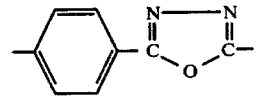

and 68 mole % recurring units of the formula

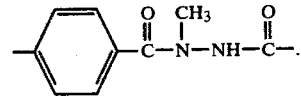

The inherent viscosity of the polymer of the dope was 3.7.

EXAMPLE 17

In this example fiber of para-phenylene oxadiazole/N-methylhydrazide copolymer containing 22 mole % para-phenylene oxadiazole recurring untis and 78 mole % para-phenylene N-methylhydrazide recurring untis was prepared by a procedure similar to that described in Example 16. In this instance the fiber was annealed by passing it from the steam-dryer roll around a 280° C. hot pin (one wrap). The fiber was then drawn 7.40 times by passing it directly from the hot pin over two hot shoes in series and positioned directly in front of and in line with the hot pin. The two shoes were heated at 347° C. and 352° C., respectively. The fiber was then collected. The fiber (Fiber 17A) had the following tensile properties:

| Tenacity: | 9.7 gpd |
|---|---|
| $E_b$: | 4.8% |
| Modulus (max.): | 240 gpd |
| Work-to-break: | 0.25 gcm/den.cm. |

When the hot pin was removed and the experiment repeated, the fiber (Fiber 17B) had the following tensile properties:

| Tenacity: | 8.5 gpd |
|---|---|
| $E_b$: | 4.2% |
| Modulus (max.): | 240 gpd |
| Work-to-break: | 0.19 gcm/den.cm. |

The results of the above experiments show that the annealing of the fiber prior to hot-drawing resulted in a 13% increase in tenacity and a 14% increase in $E_b$. The hot-draw ratio was virtually the same in both instances, 7.40 with annealing and 7.24 without annealing. The inherent viscosity of the dope polymer was 3.4

EXAMPLE 18

In this example a fiber of para-phenylene oxadiazole/N-methylhydrazide copolymer having a 29/71 molar ratio of oxadiazole to N-methylhydrazide recurring units was prepared similar to the procedure described in Example 17 by polymerization at 125° C. for 18 hours. By annealing the fiber in the manner described in Example 17, the tenacity of the hot-drawn yarn was increased from 10.6 gpd to 12.8 gpd, a 21% increase. The inherent viscosity of the dope polymer in this instance was 5.7.

EXAMPLE 19

This example compares two embodiments of the invention, (i) annealing in line with hot-drawing as illustrated in Example 17 and 18 and (ii) annealing independent of hot-drawing as illustrated in Example 16 with hot-drawing without annealing.

The fibers used for the comparison were identical to the fibers described in Example 16. One fiber (Fiber 19A) was processed the same as Fiber 1B, that is, the fiber was hot-drawn without annealing using two hot shoes in series as described in Example 16. Another fiber (Fiber 19B) was processed the same as Fiber 1A, that is, the fiber was annealed prior to being hot-drawn by passing it from the dryer roll to a 280° C. hot pin (one wrap) back to the dryer roll (several wraps) and then over the hot shoes. The other fiber (Fiber 19C) was processed the same as Fiber 17A, that is, the fiber was annealed prior to being hot-drawn by passing it from the dryer roll to a 280° C. hot pin (one wrap) positioned directly in front of and in line with the hot shoes and then over the hot shoes. The tensile properties of each of the resulting fibers are given below:

|  | Yarn 19A | Yarn 19B | Yarn 19C |
|---|---|---|---|
| Tenacity (gpd) | 12.7 | 15.1 | 14.0 |
| $E_b$ (%) | 5.3 | 5.8 | 5.7 |
| Modulus (max) (gpd) | 297 | 310 | 292 |
| Work-to-break (gcm/den.cm) | 0.35 | 0.45 | 0.41 |

EXAMPLE 20

This example illustrates an embodiment of the invention whereby the tensile properties of the fibers can be further increased. According to this embodiment the fibers are annealed not only before but also after hot-drawing.

Three fibers identical to the fiber of Example 16 were prepared. One of the fibers (Fiber 20A) was prepared without annealing prior to hot-drawing in the same manner as Fiber 16B. Another of the Fibers (Fiber 20B) was prepared with annealing prior to hot-drawing in the same manner as Fiber 16A. The other fiber (Fiber 20C) was prepared in the same manner as Fiber 20B except that, after it was passed over the second hot shoe, the fiber was passed around a 280° C. hot pin (one wrap) and then collected. The tensile properties of the fiber are given below:

|  | Fiber 20A | Fiber 20B | Fiber 20C |
|---|---|---|---|
| Tenacity (gpd) | 8.5 | 9.0 | 11.1 |
| $E_b$ (%) | 4.6 | 4.7 | 4.4 |
| Modulus (max) (gpd) | 244 | 259 | 303 |
| Work-to-break (gcm/den.cm) | 0.22 | 0.24 | 0.26 |
| Hot-Draw ratio | 90 | 9.5 | 9.4 |

EXAMPLE 21

In this example a fiber of a para-phenylene oxadiazole/N-methylhydrazide copolymer having a 50/50 molar ratio of oxadiazole to N-methylhydrazide recurring units was prepared using the same procedure that was used in preparing the fiber of Example 16 except that equimolar amounts of terephthalic acid and dimethylterephthalate were used and the fiber was annealed just before and just after the hot-drawing thereof by using two heated pins (280° C.) and the following procedure. After the fiber was passed over and around the steam-heated drying roll with several wraps as described in Example 16, it was pulled around a 280° C. hot pin (one wrap) with a draw ratio of 1 and returned to the drying roll. Then, after making several wraps around the drying roll, the fiber was drawn 21.5 times by passing it from the drying roll over a series of two hot shoes at 367° and 366° C. From the second hot shoe the fiber was then passed around a second 280° C. hot pin with one wrap and finally collected at a speed of 1105 feet per minute. The tensile properties of five samples of the resulting fiber were determined and are given below:

| Sample No. | Tenacity (gpd) | Elongation (%) | Modulus (gpd) |
|---|---|---|---|
| 1 | 14.99 | 5.1 | 360.5 |
| 2 | 23.74 | 5.8 | 464.7 |
| 3 | 20.11 | 5.4 | 416.7 |
| 4 | 27.97 | 5.3 | 616.3 |
| 5 | 19.10 | 5.7 | 386.3 |

| Sample No. | Tenacity (gpd) | Elongation (%) | Modulus (gpd) |
|---|---|---|---|
| Average | 21.18 | 5.5 | 448.92 |

EXAMPLE 22

This example illustrates the improvement of the present invention using heated, rotating rolls to anneal the fiber.

Fiber was prepared from monomers as described in Example 16 using a 75/25 molar ratio of terephthalic acid to dimethylterephthalate, a polymerization time of 6 hours at 140° C., and a spinning process similar to that used in Example 16 for processing Fiber 16A except that, after the fiber was dried on the steam-dryer roll, the fiber was passed around two rotating rolls heated to 349° C. and 376° C., respectively, then over a 443° C. hot shoe and finally collected. The resulting fiber had a tenacity of 9.1 gpd. This represents an increase in tenacity of 26% over annealed fiber, that is, fiber prepared in the same way but with the heated, rotating rolls removed from the spinning process.

I claim:

1. A fiber of a copolymer consisting essentially of recurring units of the formulas

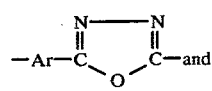 (I)

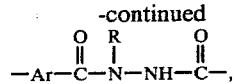 (II)

wherein Ar is arylene and R is lower alkyl and wherein the mole ratio of units (I) to units (II) is between 20:80 and 95:5, said fiber being characterized in having a tenacity ranging from 8.5 to 30 grams per denier and a modulus ranging from 150 to 625 grams per denier.

2. The fiber of claim 1 having a tenacity of at least 12 grams per denier.

3. The fiber of claim 2 having a modulus of at least 250 grams per denier.

4. The fiber of claim 3, wherein Ar is

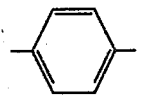

and R is —CH$_3$ and the mole ratio of units (I) to units (II) in said copolymer is between about 40:60 and 80:20.

5. The fiber of claim 4 having a tenacity of at least 18 grams per denier.

6. The fiber of claim 5 having a modulus of at least 350 grams per denier.

7. The fiber of claim 6, wherein Ar is

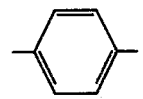

and R is —CH$_3$ and the mole ratio of units (I) to units (II) in said copolymer is between 60:40 and 40:60.

* * * * *